United States Patent [19]
Murib

[11] 3,764,666
[45] Oct. 9, 1973

[54] PREPARATION OF ALUMINUM HYDRIDE
[75] Inventor: Jawad H. Murib, Cincinnati, Ohio
[73] Assignee: National Distillers and Chemical Corporation, New York, N.Y.
[22] Filed: Aug. 7, 1968
[21] Appl. No.: 750,743

[52] U.S. Cl........... 423/645, 260/270 R, 260/326.8, 260/448 R
[51] Int. Cl.............................................. C01b 6/00
[58] Field of Search........................ 23/204; 423/645

[56] References Cited
UNITED STATES PATENTS
3,505,246   4/1970   Ehrlich et al. ..................... 149/19 X OTHER PUBLICATIONS
Wiberg, AEC-TR-931, Technical Information Service, Oak Ridge, Tenn., April 8, 1954, pp. 7 to 10
Mackay, Hydrogen Compounds of the Metallic Elements, E & F. N. Spon Ltd., London, 1966, pp. 108 to 113 (QD181H1M3)

*Primary Examiner*—Leland A. Sebastian
*Attorney*—Allen A. Meyer, Jr.

[57] ABSTRACT

A process is provided for the preparation of aluminum hydride by the thermal decomposition of tertiary amine-alane adduct in the presence of a Group IA or Group IIA metal hydride or organometallic compound catalyst. The catalyst is preferably a complex metal hydride or organometallic catalyst containing the Group IA or Group IIA metal plus either aluminum or boron.

28 Claims, No Drawings

PREPARATION OF ALUMINUM HYDRIDE

This invention relates to a novel process for the preparation of aluminum hydride.

Aluminum hydride, or alane, has long been known, but previous methods for preparing this material were inefficient.

The previous processes for the production of aluminum hydride suffered from the problems of either extremely high cost or inability to obtain a pure product. A high degree of purity is necessary in order to obtain a stable material. One of the processes previously used involves the reaction of aluminum chloride with a complex aluminum hydride. e.g. lithium aluminum hydride. This process suffers from several disabilities: Lithium aluminum hydride is an extremely costly material and the use of an aluminum chloride reactant results in a final product containing residual aluminum-chlorine bonds, as well as some elemental aluminum, which have a detrimetnal effect on the stability of aluminum hydride. Furthermore, as this process is carried out in a diethyl ether solvent, the interaction of the ether solvent with the aluminum chloride causes a significant amount of ether cleavage which forms additional undesirable by-products. This further decreases the purity and the resultant stability of the final product. Purification of the aluminum hydride to remove the solid, insoluble, elemental aluminum or residual aluminum chloride bonds is difficult, because all three are solids.

Working with an aluminum hydride-trimethylamine adduct, i. e. $AlH_3 \cdot 2NR_3$, Wiberg et al. (Berichte, 75B 2003-12 in Z. fur anorganische und allgemeine Chemie, 272 221-232 (1953)) claimed that when heated between 100°C. and 135°C., the adduct will decompose to form pure alane, but in fact, the product is a mixture of a very small amount of alane plus a major amount of elemental aluminum and a large amount of a poly alane-trimethylamine adduct. These processes are too inefficient for use on a commercial scale, because they produce an aluminum hydride product which contains a very large amount of impurities which cannot be removed because they are insoluble solids.

The present invention provides a process for preparing solid polymeric aluminum hydride that is pure and stable.

In the process of this invention, a tertiary amine-alane adduct is thermally decomposed in the presence of a catalytic amount of a Group IA or Group IIA metal hydride or organometallic catalyst, to form alane and the corresponding tertiary amine. The reaction proceeds according to the equation:

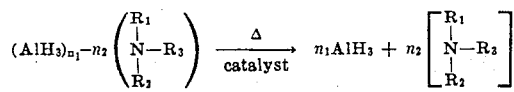

$R_1$, $R_2$ and $R_3$ are organic radicals, as defined hereinafter, $n_1$ and $n_2$ are integers equal to one or more.

The main advantage of this process is that the starting alane-tertiary amine adduct is volatile and can be readily purified by sublimation. The removal of undesirable impurities from the starting material permits preparation of high purity alane. A further advantage is that the volatility of the byproduct, tertiary amine, allows its removal by simple distillation leaving nonvolatile polymeric aluminum hydride.

The adduct should be decomposed at a temperature below the decomposition temperature of the alane or the alane polymer product. Preferably, the tertiary amine has a total of at least four carbon atoms, and optimally at least six carbon atoms. Further the tertiary amine or the alane is removed from the reaction mixture, so as to drive the reaction to completion.

The process is carried out at a temperature above the decomposition temperature of the tertiary amine-alane adduct to form aluminum hydride and the corresponding tertiary amine, but below the decomposition temperature of aluminum hydride. It is preferred that the temperature be less than 90°C. Usually, the temperature is in the range from about 35°C. to about 90°C. At temperature below 35°C., the rate of the decomposition reaction is extremely slow, but the process can be carried out at lower temperatures, if this is not a disadvantage. To prevent hydrolysis of the aluminum hydride, the reaction mixture should be anhydrous, and the system should be oxygen-free, such as under nitrogen or other inert gas.

To assist in driving the decomposition reaction to completion, at least one of the products should be removed from the reaction mixture, preferaly as it is formed. The tertiary amine can be removed from the reaction zone by distillation, desirably under reduced pressure, so as to keep the reaction mixture at below 90°C. The amine also can be removed by sweeping with inert diluent or solvent vapors, or with an inert gas, such as nitrogen. A reduced pressure, if used, is not so low that the tertiary amine-alane adduct is volatilized at the temperature at which the reaction is carried out. Generally, pressures of from about $10^{-8}$ up to about 50 mm. of Hg. are satisfactory. Reaction is complete when evolution of tertiary amine ceases.

The aluminum hydride can be washed with a nonsolvent for alane that is a solvent for the amine-alane adduct and also preferably for the metal hydride or organometallic catalyst separating the solid aluminum hydride residue, followed by vacuum distillation of the residue to about $1^{-8}$ mm. Hg. and at a temperature up to the decomposition temperature of the alane product, to remove the solvent and any other volatile impurities.

In order to facilitate the intimate admixture of the metal hydride catalyst and the tertiary amine-alane adduct, the materials are preferably mixed as slurries or solutions in an inert liquid or solvent medium. This liquid or solvent can be removed before decomposition of the adduct, if desired.

In the most preferred embodiment of this invention, the tertiary amine-alane adduct and the metal hydride or organometallic catalyst are dispersed in a volatile inert diluent or solvent medium. The liquid is then distilled off, desirably under moderately reduced pressure, and the intimately mixed reactants are maintained at a temperature in the range of from about 35° C. up to the decomposition temperature of the alane product, and preferably up to about 90°C., and at a pressure of from about $10^{-8}$ to about 50 mm. Hg. The amine that is liberated is removed as the reaction proceeds. The nonvolatile residue remaining after reaction is completed is then washed with a solvent for the tertiary amine-alane adduct and for the catalyst to remove any unreacted adduct and residual catalyst, and finally subjected to reduced pressure to remove the solvent and any remaining adduct. The residue is polymeric aluminum hydride.

If desired, however, the decomposition reaction can also be carried out in a solvent for the adduct that is a nonsolvent for aluminum hydride. The aluminum hydride precipitates, with the liberation of tertiary amine, which can be distilled off. Any solvent which distills with the amine acts as a sweep, to aid in removing amine, and can be recycled after separation from the amine, if desired. The precipitate is removed by filtering or centrifuging. The reaction is complete when evolution of amine ceases. The filtered solid alane product is then purified, as indicated previously, by washing with a solvent for the tertiary amine and the tertiary amine-alane adduct that is also a nonsolvent for aluminum hydride. Preferably, the solvent is also a solvent for the metal hydride or organometallic catalyst, so that it is also removed from the aluminum hydride. The aluminum hydride is then subjected to a high vacuum, to remove any remaining volatile impurities. In this embodiment, the pressure is maintained high enough to maintain sufficient solvent in the liquid phase during the decomposition: in the case of diethyl ether, from two to three atmospheres may be required. The solvent should be less volatile than the tertiary amine. The solvent can be selected from among the solvents for the alane-amine adducts referred to below.

The solvent in which the reaction can be carried out can be a hydrocarbon, which can be aromatic, such as benzene, toluene, ethyl benzene, isopropyl benzene, and xylene; aliphatic, such as pentane, hexane, 2,2-dimethylbutane, heptane, octane, decane, dodecane; or cycloaliphatic, such as cyclohexane, methylcyclohexane, cyclopentane; and the ethers, such as diemthyl ether, diethyl ether, diisopropyl ether, dibutyl ether, methyl propyl ether, anisole, and methyl butyl ether. The preferred solvents are the ethers and especially the lower aliphatic ethers, such as diethyl ether and methyl propyl ether.

The tertiary amine-alane adduct useful for the process of the present invention is selected from the adducts of aluminum hydride with a tertiary amine, such as the tri-hydrocarbon amines, e.g., aliphatic amines, cycloaliphatic amines, and aromatic amines, such as the mixed amines, e.g. aromatic-aliphatic amines, cycloaliphatic-aliphatic amines, and heterocyclic amines.

The tertiary amine-alane adducts useful for the process of this invention also include the adducts of nitrogen-containing heterocyclic amines, wherein the nitrogen atom is part of the heterocyclic ring. Preferably, where the nitrogen atom is connected by a double bond to a carbon atom, e.g. as in pyridine, that carbon atom should be substituted with an organic group containing at least two carbon atoms, e. g. 2-t-butyl pyridine.

The tertiary amines having one tertiary amine group have the formula:

wherein $R_1$, $R_2$ and $R_3$ are organic groups, preferably having a total of from about four up to about 24 carbon atoms, per nitrogen atom. In a most preferred embodiment, the organic groups have more than one carbon atom each, and preferably from two to about 12 carbon atoms. Any of $R_1$, $R_2$ and $R_3$ can be joined together to form a heterocyclic group including the nitrogen atom, such as in 2-t-butyl pyridine and N-ethyl piperidine. The organic groups of the amine should not contain an active hydrogen that is reactive with the catalyst or with alane. The R groups include the substituted and unsubstituted aliphatic groups, such as the alkyl groups, such as ethyl, n-propyl, isopropyl, n-pentyl, isobutyl, isopentyl, hexyl, isohexyl, 2-ethylbutyl, n-butyl, t-butyl, n-octyl, isooctyl, 2-ethylhexyl, dodecyl, decyl; aromatic groups such as phenyl, tolyl, benzyl, phenethyl, ethyl phenyl, propyl phenyl, and xylyl; and cycloaliphatic groups such as cyclohexyl, cyclopentyl, methyl cyclopentyl, and methyl cyclohexyl.

The tertiary amine can have more than one tertiary amine group, if the amine is still volatile under the reaction conditions.

The tertiary amines useful for forming the above adducts include aromatic amines such as dimethyl aniline, diethyl aniline, ethyl butyl aniline, dipropyl aniline; aliphatic amines such as methyl diethylamine, dimethyl ethyl amine, tripropylamine, trisopropylamine, ethyl dipropylamine, triethyl amine, triamyl amine, triisoamyl amine, butyl di(isohexyl) amine, tributylamine, triisobutyl amine, dibutyl ethyl amine, heptyl dibutylamine, propyl diethyl amine, and diethyl hexyl amine; and cycloalkyl amines, such as cyclohexyl dimethyl amine, cyclohexyl diethyl amine, cyclopentyl dipropyl amine, methylcyclohexyl dimethyl amine and cyclohexyl dipropyl amine. Examples of heterocyclic tertiary amines include N-methyl piperidine, N-ethyl piperidine, N-propyl piperidine, N-isopropyl piperidine, N-t-butyl piperidine, 2-propyl pyridine, and 2-isopropyl pyridine.

The tertiary amine-alane adducts described above can readily be prepared by the process described in U.S. Pat. No. 3,326,955, which is applicable generally to the preparation of tertiary amine adducts. Generally, the reaction provides for reacting under anhydrous conditions an alkali metal hydride, an aluminum trihalide and a tertiary amine in a liquid hydrocarbon diluent, and in the presence of an alkyl aluminum catalyst. Other procedures for preparing these compounds are set forth in J. Amer. Chem. Soc. 82, 2,142–2,144 (1960) and include the reaction of lithium aluminum hydride plus a tertiary amine hydrochloride, i.e. $R_3N \cdot HCl$, in an ether medium at temperatures of from −30° to 25°C. Additional early work on these adducts is described in the second part of the above article in J. Amer. Chem. Soc. 83, 535–538 (1961)

The catalysts useful in this reaction include alkali and alkaline earth metal hydrides and organometallic compounds having the general formula $M[(M'R_3\text{-}nR'_n)_xR'']_y$, wherein M is an alkali or alkaline earth metal, which are herein defined as including sodium, potassium, lithium, cesium, calcium, barium, magnesium and strontium; M' is aluminum or boron, R, R' and R'' are hydrogen or a saturated hydrocarbon group or an aromatic hydrocarbon group, $n$ is 1, 2 or 3, $x$ is 0 or 1 and $y$ is a number equal to the valence of the metal M and can be 1 or 2. When $x$ is zero, the catalyst is a simple alkali metal or alkaline earth metal hydride or organometallic compound having the formula $MR''_y$, wherein M, R'' and $y$ are as defined above, or a mixture of, for example, aluminum hydride and an alkali metal or alkaline earth metal hydride or corresponding organometallic compounds. Preferably, the complex alkali or alkaline earth metal aluminum hydride catalysts are used. When a simple metal hydride or organometallic compound is used, it is believed that it reacts with the initial aluminum hydride product to form the complex aluminum hydride, e.g. LiAlH$_4$. The simple metal hydrides are generally insoluble in the solvents for the tertiary amine-alane adducts. However, the complex aluminum hydrides are soluble, and are preferred for this reason.

The organometallic compounds useful as catalysts preferably contain saturated and aromatic hydrocarbon groups having up to about 10 carbon atoms. Examples of such groups include alkyl groups such as methyl, ethyl, propyl, isopropyl, butyl, isobutyl and isoamyl, cycloaliphatic groups such as cyclohexyl, phenyl, alkaryl groups such as tolyl and ethyl phenyl, and aralkyl groups such as phenethyl.

Examples of the metal hydride and organometallic catalysts include lithium aluminum hydride (LiAlH$_4$), lithium hydride, magnesium aluminum hydride, magnesium hydride, cesium hydride, sodium hydride, potassium hydride, calcium hydride, sodium aluminum hydride, potassium aluminum hydride, cesium aluminum hydride, calcium aluminum hydride, strontium aluminum hydride, sodium borohydride, lithium borohydride, calcium borohydride, magnesium borohydride and cesium borohydride, methyl lithium, methyl lithium aluminum trihydride, butyl lithium, phenyl sodium, ethyl lithium, phenyl sodium aluminum trihydride diethyl magnesium, ethyl potassium, magnesium bis-(ethyl aluminum trihydride), butyl cesium, tetraethyl lithium aluminum, ethyl lithium borohydride, phenyl potassium and triethyl aluminum sodium hydride.

It is also possible to use the tertiary amine adducts of the above metal hydrides or organometallic compounds as the catalyst. It is believed that this adduct is formed in situ during the reaction, so that it can be added as the catalyst. Accordingly, the catalysts as defined above are to include these adducts.

The metal hydride or organometallic catalysts are believed to be necessary not only to decompose the tertiary amine-alane adduct, but also to prevent the decomposition of the alane product.

Under commercial conditions the metal hydride or organometallic catalyst which is removed from the alane product by extraction with an ether solvent can be reused, either by directly adding the ether solution to fresh tertiary amine-alane adduct, or by recrystallizing the catalyst from the ether and then adding the catalyst to a fresh batch of the tertiary amine-alane adduct. The lithium and magnesium complex hydrides, for example, are soluble in diethyl ether. However, in most cases, the catalyst need not be removed from the final product because of the small amounts present.

The following examples set forth preferred embodiments of the process of this invention.

EXAMPLE 1

A solution of 69 ml. of diethyl ether containing 12.55 g. of tripropylamine-alane adduct ((C$_3$H$_7$)$_3$N:AlH$_3$) and 1.32 g. of lithium aluminum hydride catalyst was placed in a 100 ml. round bottom flask. The flask was attached to a U-tube connected to a vacuum line. The ether was vacuum distilled off at room temperature. The adduct was then decomposed by heating in an oil bath at 75°–80°C. under a reduced pressure of from 5 to 10 mm. Hg. The tripropylamine liberated was distilled off, and condensed in the U-tube held at −78°C. After 7 hours of heating 5.38 g. of tripropylamine was obtained, which corresponded to a 51.7 percent conversion, based upon the initial adduct. The alane, which was the solid residue, was then subjected to a vacuum of 10$^{-4}$ mm. Hg. at 68°C. for 10 minutes, and washed with additional diethyl ether to extract the lithium aluminum hydride and any undecomposed tripropylamine-alane adduct. The alane was then heated at 58°C. for 8 hours under a vacuum of 10$^{-4}$ mm. Hg. to complete the removal of ether. The solid product was alane of high purity, as determined by analysis as follows.

A sample of the solid product was hydrolytically analyzed by mixing with water followed by an aqueous sodium hydroxide solution. The evolved hydrogen was measured and corresponded to 10.3 weight percent hydrogen compared to a theoretical 10.0 weight percent for alane. The proportion of aluminum in the solid product was then determined by the 2-hydroxyquinoline method. The atomic ratio H:Al found by this analysis was 2.96, compared to a theoretical ratio of 3.0 for alane. There was no free aluminum metal detected.

EXAMPLE 2

The process of Example 1 was repeated except that the decomposition of the adduct, after distilling off the ether solvent, was carried out at 68°C. under a reduced pressure of from 5 to 15 mm. Hg. for 12 hours. The non-volatile residue was subjected to a high vacuum of 10$^{-4}$ mm. Hg. at 68°C. for 2 hours. The amount of tripropylamine collected corresponded to 76.5 percent conversion of the adduct reactant. The alane product was further washed with diethyl ether and vacuum heated at 58°C. and 10$^{-4}$ mm. Hg. for 8 hours. Analysis based on hydrolytic hydrogen showed that the product was 96.3 weight percent alane. The lithium content found was 0.15 weight percent.

EXAMPLE 3

An ether solution (163.4 g.) containing 66.2 g. of triethylamine-alane adduct ((C$_2$H$_5$)$_3$N:AlH$_3$) and 2.96 g. lithium aluminum hydride was placed in a 300 ml. flask provided with a magnetic stirrer. The ether was then vacuum distilled at room temperature. The solid adduct was then decomposed at 50°C. for four hours under a reduced pressure of 2 to 5 mm. Hg. to decompose the adduct. The non-volatile residue was then heated at 90°C. under high vacuum (10$^{-4}$ mm. Hg.) for about 10 minutes, and then at room temperature until all of the unreacted amine-alane adduct had been removed. The resulting alane, the non-volatile residue, was then washed with diethyl ether. A sample of the ether-insoluble solid product was then subjected to X-ray analysis and was found to be substantially pure aluminum hydride, free from amine or ether residue. The X-ray diffraction pattern also indicated the absence of any elemental aluminum, and is set forth below in Table I.

TABLE I

X-Ray Diffraction Pattern of AlH$_3$ Produced from the Dissociation of Et$_3$N:AlH$_3$

| d-spacing | I/I$_o$ | d-spacing | I/I$_o$ |
|---|---|---|---|
| 3.24 | 100 | 1.15 | — |
| 2.35 | 45 | 1.13 | 2.5 |
| 2.23 | 35 | 1.116 | 1.2 |

| | | | |
|---|---|---|---|
| 2.13 | 4 | 1.097 | — |
| 1.97 | 7.5 | 1.078 | 4 |
| 1.83 | 20 | 1.040 | 5 |
| 1.61 | 20 | 1.027 | — |
| 1.48 | 22 | 1.008 | 6 |
| 1.45 | 2.5 | 0.970 | 2.5 |
| 1.42 | 15 | 0.955 | 1 |
| 1.38 | 7.5 | 0.955 | 1 |
| 1.31 | 12.5 | 0.920 | 4 |
| 1.28 | 6 | 0.901 | 2.5 |
| 1.17 | 2.5 | — | — |

EXAMPLE 4

A solution of 65 g. of toluene containing 4.6 g. triethylamine-alane adduct $((C_2H_5)_3N:AlH_3)$ was mixed with a solution of 1.2 g. of lithium aluminum hydride dissolved in 31 g. of diethyl ether. The mixture was subjeted to vacuum distillation at room temperature to remove the ether and toluene. The solid residue was then decomposed at 70°C. and at 2 to 5 mm. Hg. pressure for 1 hour, and then at 80°C. for an additional 1.5 hours. The triethyl amine was removed overhead and condensed; the amount recovered corresponded to a 62.6 percent conversion, based on the initial amine-alane adduct reactant. The solid alane residue was then washed with ether to remove the lithium aluminum hydride, and heated at 58°C. and at $10^{-4}$ mm. Hg. to remove the ether solvent.

A sample of the solid product was hydrolytically analyzed by treatment with water followed by an aqueous sodium hydroxide solution. The evolved hydrogen was measured, and corresponded to a purity of 93.0 weight percent aluminum hydride. The product was next analyzed for aluminum, and the atomic ratio of hydrogen to aluminum found was 3.09. The lithium content was 0.13 weight percent.

EXAMPLE 5

A suspension of 0.02 g. of lithium hydride in 1 ml. of diethyl ether was mixed with 3 g. of triethylamine-alane adduct $((C_2H_5)_3N:AlH_3)$. The mixture was decomposed at 68°C. and a pressure of 10 mm. Hg. for 1.5 hours, and then at 76°C. for one hour. Triethyl amine was removed overhead and condensed; the amount obtained corresponded to a 72.5 percent conversion of the amine-alane adduct. The non-volatile residue was washed with ether.

An alane of high purity was obtained. A sample was analyzed by hydrolytic analysis and also analyzed for aluminum. 10.5 weight percent hydrogen was found, compared to a theoretical 10.0 weight percent for pure alane. The atomic ratio of hydrogen to aluminum found was 3.06, and the amount of lithium in the final product found was 0.09 weight percent.

EXAMPLE 6

The process of Example 5 is repeated with magnesium hydride being substituted for lithium hydride as the catalyst. Alane is produced, in a high conversion and a high purity.

EXAMPLE 7

The procedure of Example 5 is repeated with magnesium aluminum hydride being used as the catalyst. Aluminum hydride of a high purity and in a good conversion is obtained, as in Example 5.

EXAMPLE 8

The process of Example 4 is repeated, but substituting sodium aluminum hydride as the catalyst and washing with refluxing dimethyl ether. The aluminum hydride is of high purity and is obtained in a good conversion.

EXAMPLE 9

The procedure of Example 8 is repeated except that calcium hydride is used as the catalyst. Aluminum hydride of good purity is obtained, in a good conversion.

EXAMPLE 10

The procedure of Example 1 is repeated, except that lithium borohydride is used as the catalyst. The aluminum hydride product is of high purity, and is obtained in good conversion.

EXAMPLE 11

The procedure of Example 1 is repeated except that the adduct 2-isopropyl pyridine-alane is dissociated in the presence of lithium aluminum hydride. The aluminum hydride product is of high purity, and is obtained in good conversion.

EXAMPLE 12

A solution 500 ml. of diethyl ether was prepared containing 18.3 g. of dimethylaniline-alane adduct $(C_6H_5N(CH_3)_2:AlH_3)$ and 0.49 g. lithium aluminum hydride. The solution was subjected to vacuum distillation at room temperature. When 150 ml. of solution remained, a crystalline solid precipitated which was Soxhlet-extracted with additional ether to remove any ether-soluble compounds such as any unreacted adduct. A sample of the ether-insoluble residue was then pumped in vacuum at 60°C. and $10^{-4}$ mm. Hg. The solid product contained 53.7 weight percent aluminum hydride based on hydrolytic hydrogen and was found to have an atomic ratio of hydrogen to aluminum of 2.7.

EXAMPLE 13

A solution of 65 g. of toluene containing 4.6 g. triethylamine-alane adduct is mixed with a solution of 1.2 g. of magnesium borohydride dissolved in 31 g. of diethyl ether. The mixture is subjected to vacuum distillation at room temperature to remove the ether and toluene. The adduct is decomposed at 70°C., sweeping with argon at 760 mm. Hg. pressure for 6 hours, and then at 80°C. for an additional 1.5 hours. The liberated triethylamine is condensed in a U-tube held at −78°C. and the argon vented through a mercury bubbler. The solid product is washed with ether to remove the magnesium borohydride, and heated at 58°C. and at $10^{-4}$ mm. Hg. to remove any residual adduct and ether solvent leaving high purity alane.

EXAMPLE 14

A solution of 0.05 g. of lithium triethyl aluminum hydride in 4 ml. of diethyl ether is mixed with 12 g. of trihexylamine-alane adduct. The adduct is decomposed at 68°C. and a pressure of 1.0 mm. Hg. for 1.5 hours, and then at 76°C. and $10^{-4}$ mm. Hg. for 1 hour. Trihexylamine is removed overhead and condensed. The alane residue is washed with ether. Aluminum hydride of high purity is obtained in good yield.

EXAMPLE 15

A suspension of 0.03 g. of lithium butyl in 2 ml. of diethyl ether is mixed with 7 g. cyclohexyl diethylamine-alane adduct $(C_6H_{11}(C_2H_5)_2N:AlH_3)$. The adduct is decomposed by heating at 68°C. under a reduced pressure of 0.1 mm. Hg. for 1.5 hours, and then at 76°C. and 10⁻⁴ mm. Hg. for 1 hour Cyclohexyl diethylamine is removed overhead and condensed. The nonvolatile alane residue is washed in ether. Aluminum hydride of high purity is obtained in good conversion.

EXAMPLE 16

Triethylamine-alane adduct, 4.54 g. (35 mmoles), and lithium aluminum hydride-triethylamine adduct catalyst (0.07 g.) were combined in a mixture of toluene, 76.3 g. and diethyl ether, 71 g. The catalyst was prepared by the method set forth in Inorganic Chemistry, 5, 1,284 (1966). The mixture was subjected to fractional distillation at 40°C. and atmospheric pressure. The amine released by the decomposition of the alane adduct was distilled off with a portion of the ether which acts to sweep out the amine from the reactor. The temperature was gradually raised during distillation to 80°C. A white solid formed and heating was discontinued when 105 grams of distillate was collected. The distillate continued 2.5 grams of triethylamine (24.72 mmoles), corresponding to 71.5 percent conversion of the initial charge of alane adduct.

The solid alane product was separated from the reaction mixture by filtering, washed with fresh ether and vacuum dried at 56°C. for 1 hour. The product contained 48.8 percent by weight aluminum hydride and had a ratio of hydrogen/aluminum of 2.86/1.

In order to compare the efficacy of the process of the present invention, the decomposition of triethylamine alane was carried out in the absence of the catalyst. A solution of 30.5 g. of diethyl ether containing 3.27 g. mol. of the triethylamine-alane adduct was heated at 74°C. for 3 hours at a pressure of 7 mm. Hg. The triethylamine was distilled off, and condensed; 2.06 g. of triethylamine was recovered, corresponding to a conversion of 64 percent, based on the initial amine adduct reactant present. The nonvolatile residue was then washed in ether, filtered and washed with additional ether. X-ray analysis of the ether-insoluble solid disclosed a mixture containing a small amount of aluminum hydride and a large amount of elemental aluminum.

Having regard to the foregoing disclosure the following is claimed as the inventive and patentable embodiments thereof:

1. A process for the preparation of aluminum hydride comprising decomposing a tertiary amine-alane adduct in the presence of a metal hydride or organometallic catalyst having the formula $M[(M'R_3-nR'_n)_xR'']_y$ and tertiary amine adducts thereof, wherein M is an alkali metal or an alkaline earth metal, M' is aluminum or boron, the R, R' and R'' groups are hydrogen or saturated or aromatic hydrocarbon groups having up to about 10 carbon atoms, n is 1, 2 or 3, x is 0 or 1 and y is equal to the valence state of the metal M, to form as a product, aluminum hydride and the corresponding tertiary amine and separating the aluminum hydride and the tertiary amine.

2. The process of claim 1 wherein the adduct is decomposed at a pressure at which the tertiary amine distills off at the reaction temperature.

3. The process of claim 1 wherein the aluminum hydride-tertiary amine adduct is decomposed by heating under vacuum at a temperature below the decomposition temperature of aluminum hydride but above the boiling point of the amine at the pressure used.

4. The process of claim 1 wherein x is 1, M' is aluminum, and R is hydrogen.

5. The process of claim 1 wherein either the corresponding tertiary amine or the aluminum hydride product is removed as it is formed.

6. The process of claim 5 wherein the corresponding tertiary amine is removed by distillation.

7. The process of claim 6 wherein the amine is removed by distillation with sweeping with an inert gas.

8. The process of claim 6 wherein the amine is removed by distillation under vacuum.

9. The process of claim 6 wherein the purification of the aluminum hydride product further comprises washing the aluminum hydride product with ether, filtering to remove the solid residue and subjecting the solid residue to vacuum distillation at a temperature of less than 90°C.

10. The process of claim 9 wherein the aluminum hydride is subjected to a pressure of less than about 10⁻⁴ mm. Hg. to remove volatile impurities.

11. The process of claim 1 wherein the reaction mixture comprises a solution of the adduct in a solvent.

12. The process of claim 11 wherein the corresponding tertiary amine is separated as it is formed by distillation and wherein the boiling point of the tertiary amine is lower than the boiling point of the solvent.

13. The process of claim 11 wherein the solvent comprises a low boiling liquid and a higher boiling liquid and wherein the decomposition is carried out at atmospheric pressure at a temperature of between about 35°C. and about 90°C., below the boiling point of the high boiling liquid but above the boiling point of the low boiling liquid, so that the corresponding amine is distilled off with a portion of the low boiling liquid which acts as a sweep for the amine, and filtering out the alane product formed.

14. The process of claim 1 wherein the reaction is carried out at a temperature of between about 35° and about 90°C.

15. The process of claim 1 wherein the reaction is carried out at a pressure of between about 10⁻⁸ mm. to about 50 mm. Hg.

16. The process of claim 1 wherein the decomposition is carried out at a temperature of between about 35° and 90°C. and at a pressure between about 1 mm. to about 50 mm. Hg., so that the corresponding amine is distilled off as it is formed, and the aluminum hydride product is subsequently purified by washing with a solvent for the tertiary amine-alane adduct and for the metal hydride or organo-metallic catalyst, which is a nonsolvent for the aluminum hydride, and removing the solvent and any additional volatile impurities by subjecting the product to a pressure of less than about 10⁻⁴ mm. Hg. at a temperature of less than 90°C.

17. The process of claim 15 wherein the tertiary amine-alane adduct is first dispersed with a metal hydride or organometallic catalyst in a liquid, the liquid is then removed by vacuum distillation at room temperature to leave an intimate mixture of the tertiary amine-alane adduct and the metal hydride catalyst.

18. The process of claim 1 wherein the corresponding tertiary amine has the formula:

wherein $R_1$, $R_2$ and $R_3$ are organic groups having a total of at least about four carbon atoms and wherein any of $R_1$, $R_2$ and $R_3$ can be joined together to form a heterocyclic group including the nitrogen atom.

19. The process according to claim 17 wherein the R groups are selected from the group consisting of aliphatic, cycloaliphatic, and aromatic substituents.

20. The process according to claim 18 wherein the tertiary amine is a nitrogen-containing heterocyclic amine.

21. The process according to claim 18 wherein the tertiary amine is triethylamine.

22. The process according to claim 18 wherein the tertiary amine is tripropylamine.

23. The process according to claim 1 wherein the catalyst is lithium hydride.

24. The process according to claim 23 wherein the catalyst is $LiAlH_4$.

25. The process according to claim 23 wherein the catalyst is $LiBH_4$.

26. The process according to claim 23 wherein the catalyst is $MgH_2$.

27. The process according to claim 23 wherein the catalyst is $Mg(AlH_4)_2$.

28. The process according to claim 23 wherein the catalyst is $Mg(BH_4)_2$.

* * * * *